Patented Nov. 13, 1928.

1,691,087

UNITED STATES PATENT OFFICE.

JOHN C. SHERMAN, OF PORTLAND, MAINE, ASSIGNOR TO BROWN COMPANY, OF PORTLAND, MAINE, A CORPORATION OF MAINE.

MARGARINE COMPOSITION.

No Drawing.   Application filed December 9, 1922.   Serial No. 605,978.

The present invention relates to margarine or butter substitutes of the sort disclosed in my patent for butter substitute No. 1,444,562 February 6, 1923, application for which was filed August 22, 1919, Serial No. 319,123; that is, a product consisting of an edible fat combined with a dry milk powder in sufficient proportion to confer palatability and to approximate the flavor of creamery butter. Such product is free from water and retains its palatable qualities without deterioration for long periods of time and under varying temperature conditions. In other words, the product keeps "sweet" much longer than the margarines made with skimmed milk.

I have now developed a composition embodying the principles disclosed in my above named application and made wholly of substances or products obtained from peanuts, namely, peanut oil and a milk-like product which is obtained from peanuts and is in many respects similar to cow's milk. I have also applied in the new product a mode or means of combining dry milk or milk-like products with fats by combining them in a colloidal condition, which causes the particles of dry milk, or milk-like substance, or other dry flavoring material, to remain in dispersed suspension throughout the body of the fat or oil, even when the latter is liquefied, and prevents settling of the dry pulverulent material by gravity when the fat is liquefied. This phase of the invention is of general application in all conditions where a dry milk-like product, or any suitable dry flavoring matter, is compound with a fat or oil to produce a margarine, and is not restricted to the particular composition of peanut products above mentioned.

Still another phase of the invention consists in the combination of the milk-like product of peanuts in a dry and finely subdivided condition with fats of any nature to produce a waterless margarine of the same nature as that disclosed in my prior patent aforesaid.

First as to the phase of the invention which consists in a margarine composed wholly of peanut products. The basis of this composition is a body of fat consisting of peanut oil hydrogenated to the desired state of hardness. This state is preferably that in which the fat is solid or semi-solid at ordinary temperatures and may be liquefied by moderate heat. For example the degree of hardness is preferably comparable to that of creamery butter at a temperature of 50° to 60° F.; although, of course, I do not limit the protection which I claim within narrow degrees of hardness. I combine with this hydrogenated oil a sufficient content of a milk-like product obtained from peanuts, after drying such product and reducing it to a pulverulent condition.

The milk-like product above mentioned is obtainable from the meats of peanuts after more or less of the oils has been expressed, by leaching the meats with water. The leaching method consists of percolating hot water through a mass of raw dry and finely comminuted peanut meats from which the shells and skins have been removed; the quantity of water used being in the proportions of about one gallon to one pound of the peanut meats, and being at a temperature approximating 180° Fahrenheit. The resulting milky liquid is similar to cow's milk in many respects. It contains many of the ingredients of cow's milk, as protein, casein, some sugar, vitamines, et cetera, and has a taste resembling that of milk. More sugar in the proportion of about four ounces of sugar to the gallon of liquid may be added in order to approximate the sweetness of cow's milk. The solid residuum which results from evaporating the liquid contains the ingredients above named and has the palatable flavor of milk; this residuum, being dried to substantial exhaustion of all moisture is pulverized to a fine powder and is then combined with the hydrogenated peanut oil, as above stated.

The proportional content of the dried milk-like product in the composition may be anything needed to give the desired flavor, and overcome the unpalatable fatty taste of pure fat. This content may be as low as 3% of the milk-like product to 97% of the fat, or it may be as much as 20% or more of the milk-like product to 80% or less of the fat; and there may also be added whatever amount of salt may be desired for flavoring. According as salt is added or omitted the resulting composition is similar in flavor to salted dairy butter or unsalted butter, respectively.

The dry ingredients, powdered milk-like products, or such products and salt, are added to the fat while the latter is in the liquid state produced by heat and are thoroughly mixed therewith. The mixing may be accomplished in any way, by mechanical stirring alone, or by both stirring and then passing the mixture through a homogenizing apparatus, or in any other way suitable for the purpose.

The dried and pulverulent milk-like product of peanuts may be used with other fats as well as with hydrogenated peanut oil for making a butter substitute, such as any of the edible animal or vegetable fats, or hydrogenated oils, or mixtures of animal and vegetable fats or oils, whether hydrogenated or not, and my invention includes the combination of such product with any of such fats, and with or without salt. In this specification I include within the meaning of the term "fat" any natural or derived edible fat or oil, and the hydrogenated product of any such fat or oil, and any mixture thereof.

In preparing the dried milk-like product for compounding with the fat, I preferably subdivide it to such exceeding fineness that when dispersed through the fat, the particles into which it is subdivided constitute substantially the disperse phase of a colloid of which the fat is the dispersion medium. As thus compounded the resulting composition is, in effect, a colloid, and the particles of solid matter remain in suspension in the body of the fat and are so retained by the colloidal qualities of the dispersion medium, not only in the solid, but also in the melted state of the latter. In other words, melting of the fat does not permit or cause the particles of solid flavoring material to settle by gravity to the bottom of the container, but after melting the homogeneous character of the composition remains the same as it was originally. This phase of the invention is one of general application to any waterless margarine of the character herein set forth, whatever may be the specific nature of the fatty body or the specific character of the dried milk or milk-like flavoring substance, or of any other dry solid flavoring material which may be used for the purposes herein indicated. As concerns the phase of the invention last described, which is not restricted as to the milk or milk-like product which may be used, and in definition of the terminology of the claims, the term "milk-like", when used without qualifying words, includes natural milk produced by animals, as well as the artificial product obtained from peanuts, and the like.

The products made according to the invention herein set forth have all the qualities of avoiding deterioration and loss by spoilage as set forth in my aforesaid prior application, together with the special advantages resulting from the new substances, features and processes herein described.

What I claim and desire to secure by Letters Patent is:

1. A margarine substantially free from water and comprising essentially an edible fat and a dry solid milk-like flavoring material in the form of particles in homogeneous mixture with the fat content and in a sufficiently finely divided state to constitute the disperse phase of a colloid, of which the fat is the dispersion medium.

2. A collodial composition substantially free from water and comprising an edible fat and a dry solid milk-like flavoring material subdivided to a state of fineness such that the particles thereof, being dispersed through the fat, are retained in suspended condition therein when the fat is in the liquid state.

3. A margarine substantially free from water and comprising peanut oil, hydrogenated to a quality of hardness such that it is substantially solid at ordinary temperatures, and a dry solid milk-like flavoring material in a state of such fine subdivision that the particles thereof, being in homogeneous mixture with the oil, constitute the disperse phase of a colloid of which the oil is the dispersion medium, and remain in suspension therein whether the oil is in the solid or the liquid state.

4. A margarine substantially free from water and comprising an edible fat and a content of dry solid milk-like flavoring material amounting to from 3% to 20% of the whole composition, in homogeneous mixture with said fat, and in a state of such fine subdivision that the particles thereof constitute the disperse phase of a colloid of which the fat is the dispersion medium.

5. A margarine substantially free from water comprising peanut oil hydrogenated to a quality of hardness such that it is substantially solid at ordinary temperatures, amounting in proportional content to from 80% to 95%, substantially, of the entire composition, and a subdivided dry solid milk-like flavoring material in a state of such fine subdivision that the particles thereof, being in homogeneous mixture with said oil, constitute substantially the disperse phase of a colloid of which the oil is the dispersion medium, and remain in suspension therein whether the oil is in the solid or the liquid state.

6. A margarine composition substantially free from water and comprising hydrogenated peanut oil which is substantially solid at ordinary temperatures and is liquefiable by heat, and a dry milk-like product of peanuts in a state of such fine subdivision that the particles thereof, being in homogenous mixture with said oil, constitute the disperse phase of a colloid of which the oil is the dispersion medium.

7. A margarine composition substantially free from water comprising hydrogenated peanut oil and the powdered dry milk-like product of peanuts mixed therewith.

8. A margarine composition substantially free from water comprising hydrogenated peanut oil and the powdered dry milk-like product of peanuts mixed therewith in the proportions of from 80% to 95% or more of the peanut oil to from 3% to 20% approximately of the milk-like peanut product.

9. A margarine substantially free from water comprising an edible fat and a milk-like flavoring material consisting essentially of the finely divided dry milk-like product of peanuts mixed therewith.

10. A margarine substantially free from water comprising an edible fat and finely subdivided dry milk-like product of peanuts mixed therewith in the proportions approximately of from 80% to 97% fat and 20% to 3% of the said milk-like product.

11. A margarine substantially free from water consisting of an edible fat and the dry milk-like product of peanuts subdivided to such fineness that the particles thereof, being dispersed throughout the fat, constitute substantially the disperse phase of a colloid of which the fat is the dispersion medium.

In testimony whereof I have affixed my signature.

JOHN C. SHERMAN.